United States Patent [19]
Li et al.

[11] Patent Number: 6,153,006
[45] Date of Patent: Nov. 28, 2000

[54] CONCRETE DURABILITY ENHANCING ADMIXTURE

[75] Inventors: Zongjin Li, Clear Water Bay; Chung Kong Chau, Hung Hom; Faming Li, Clear Water Bay; Baoguo Ma, Hkust, all of The Hong Kong Special Administrative Region of the People's Republic of China

[73] Assignee: The Hong Kong University of Science and Technology, The Hong Kong Special Administrative Region of the People's Republic of China

[21] Appl. No.: 09/190,216

[22] Filed: Nov. 13, 1998

[51] Int. Cl.⁷ ..................................... C04B 24/10
[52] U.S. Cl. .................... 106/805; 106/725; 106/731; 106/823; 106/131.1
[58] Field of Search .................................. 106/725, 731, 106/805, 823, 131.1, 727

[56] References Cited

U.S. PATENT DOCUMENTS

| | | | |
|---|---|---|---|
| 4,076,862 | 2/1978 | Kobeski et al. | 106/774 |
| 5,084,101 | 1/1992 | Engels et al. | 106/624 |

*Primary Examiner*—Anthony Green
*Attorney, Agent, or Firm*—Burns, Doane, Swecker & Mathis, L.L.P.

[57] ABSTRACT

An admixture for enhancing the durability of concrete to repeated freeze-thaw cycles is disclosed. The admixture comprises as an essential element a natural polymer material derived from millet. The admixture further comprises smaller quantities of naphthenic sulfate salt, triethanolamine and formaldehyde. In addition the admixture can improve concrete's impermeability and chloride ion binding capability.

13 Claims, 9 Drawing Sheets

CONCRETE DURABILITY ENHANCING ADMIXTURE

FIELD OF THE INVENTION

This invention relates to an admixture for enhancing the durability of concrete, in particular against the adverse effects of freeze-thaw cycles. The invention also relates to concretes including such an admixture.

BACKGROUND OF THE INVENTION

Concrete remains one of the most versatile and popular construction materials in the world. Although it is rare for concrete structures to fail due to lack of intrinsic strength, gradual deterioration caused by lack of durability does occur and for this reason increasingly concrete structures are failing to last for their specified and expected lifetimes.

A major cause of concrete deterioration is the deleterious effects experienced by concrete as it undergoes cycles of freezing and thawing. Concrete is a porous material. When concrete is being made, as the cement and water in fresh concrete react to form a hardened paste material binding the coarse and the fine aggregates together, voids are left in the originally water-filled space between the cement grains. These voids are known as capillary pores with a size range from approximately 5 nm to 1 mm and sometimes even larger. In addition to these capillary pores, cement paste also contains are significant volume of smaller pores called gel pores (the term "gel" being used because some of the properties of the cement hydrates are similar to those of a gel). Water retained in such pores and the effects of capillary actions in such small pores have a major effect on the durability of hardened concrete, especially when concrete is subjected to repeated freeze/thaw cycles.

Concrete deterioration caused by freezing and thawing is of course linked to the presence of water retained in the pores, but cannot simply be explained by the expansion of water on freezing. While pure water in the open freezes at 0° C., in concrete the water is really a solution of various salts that lower the freezing point. Moreover the temperature at which water in concrete can freeze varies as a function of the size of the pores, with the freezing point decreasing with the size of the pores—and since concrete has pores of various sizes there is no one single freezing point. Indeed the very smallest gel pores are too small to permit the formation of ice, and the greater part of the freezing takes place in the capillary pores. Larger voids in the concrete—resulting from incomplete compaction are usually air-filled and are not appreciably subjected to any freezing effects.

When water freezes there is an increase in volume of approximately 9%. As the temperature of concrete drops, freezing occurs gradually so that the unfrozen water in the capillary pores is subjected to hydraulic pressure caused by the volume expansion of ice. Such pressure, if not relieved, can result in internal stresses of sufficient magnitude to cause local failure of the concrete. This can occur, for example, in porous, saturated concrete containing no empty voids into which the liquid water can move. On subsequent thawing, the expansion caused by ice is maintained so that there is now new space available for additional water which may subsequently be imbibed. During re-freezing further expansion occurs and so repeated cycles of freezing and thawing have a cumulative effect. It is this repeated freezing and thawing that has a deleterious effect, rather than a single occurrence.

Two other processes contribute to the increase of hydraulic pressure of the unfrozen water in the capillaries. Firstly, since there is a thermodynamic imbalance between the gel water and the ice, diffusion of gel water into capillaries leads to a growth in the ice body and thus to an increase in hydraulic pressure. Secondly, the hydraulic pressure is also increased by the pressure of osmosis brought about by local increases in solute concentration due to the removal of frozen (pure) water from the original solution.

The extent of damage caused by repeated freeze/thaw cycles varies from surface scaling to complete disintegration as layers of ice are formed, starting at the exposed surface of the concrete and progressing through its depth. In general, concrete members which remain wet for long periods are more vulnerable.

PRIOR ART

One method of mitigating the damage caused by repeated freeze/thaw cycles is to deliberately entrain air within the cement paste by the use of an air-entrainment agent. Air-entrainment is only effective, however, when applied to mixes with low water/cement ratios so that the cement paste has only a small volume of capillaries which are segmented or discontinuous. To achieve this, the concrete should be well-compacted and substantial hydration (which requires adequate curing) must have taken place before exposure to frost. The intentionally entrained air bubbles should be clearly distinguished from accidentally entrapped air which is in the form of larger bubbles left behind during the compaction of fresh concrete.

When mixed with water, air-entrainment admixtures produce discrete bubble cavities which become incorporated in the cement paste. The critical component of the air-entrainment admixture is a surface-active agent which lowers the surface tension of water to facilitate the formation of bubbles and which subsequently ensures that they are stabilised. The surface-active agents concentrate at the air-water interfaces and have hydrophobic and hydrophilic properties which are responsible for the dispersion and stabilization of the air bubbles. The main types of air entraining agents are:

(a) animal and vegetable fats and oils and their fatty acids (b) natural wood resins, which react with lime in the cement to form a soluble resinate. The resin may be pre-naturalized with NaOH so that a water-soluble soap of a resin acid is obtained, and (c) wetting agents such as alkali salts of sulphated and sulphonated organic compounds.

The beneficial effects of air entrainment on concrete subjected to freezing and thawing cycles is to create space for the movement of water under hydraulic pressure. However there are some further effects on the properties of the concrete, not all of which are beneficial. One of the most important considerations is the influence of the voids on the strength of the concrete at all ages and when entrained air is added to a mix without any other changes in the mix proportions, there is a decrease in strength proportional to the air content. One of the main difficulties in using air-entraining admixtures is the difficulty in controlling the air-content of the hardened concrete since this is governed by many factors.

SUMMARY OF THE INVENTION

According to the present invention there is provided an admixture for enhancing the durability of concrete to freeze-thaw cycles, said admixture comprising as an essential element a natural polymer material derived from millet (eg *Panicum Miliacum* or *Setaria italica Beauv.*).

Preferably the admixture comprises natural polymer material derived from millet naphthenic sulfate salt, triethanolamine and formaldehyde. In a particular embodiment the admixture comprises natural polymer material derived from millet, naphthenic sulfate salt, triethanolamine and formaldehyde in water with the solid content of the admixture being from 10% to 40% by weight.

In particularly preferred embodiments the admixture comprises natural polymer material, naphthenic sulfate salt, triethanolamine, formaldehyde and water in the proportions:

| natural polymer material | 1 |
| --- | --- |
| naphthenic sulfate salt | 1.0–0.1, preferably 1.0–0.2 |
| triethanolamine | 0.5–0.05, preferably 0.5–0.1 |
| formaldehyde | 0.5–0.01, preferably 0.05–0.01 |
| water | 2.4–20, preferably 2.69–17.45 | by weight.

According to another aspect of the present invention there is also provided a concrete mix including an additive for enhancing the freeze-thaw durability of the mix, said additive including as an essential element a natural polymer material derived from millet (*Panicum Miliacum*).

In a preferred embodiment the admixture comprises natural polymer material derived from millet, naphthenic sulfate salt, triethanolamine and formaldehyde. In particular the admixture may comprise natural polymer material derived from millet, naphthenic sulfate salt, triethanolamine and formaldehyde in water with the solid content of the admixture being from 10% to 40% by weight.

In particularly preferred embodiments the admixture may comprise natural polymer material, naphthenic sulfate salt, triethanolamine, formaldehyde and water in the proportions:

| natural polymer material | 1 |
| --- | --- |
| naphthenic sulfate salt | 1.0–0.1, preferably 1.0–0.2 |
| triethanolamine | 0.5–0.05, preferably 0.5–0.1 |
| formaldehyde | 0.5–0.01, preferably 0.05–0.01 |
| water | 2.4–20, preferably 2.69–17.45 | by weight.

In a further embodiment, the admixture may comprise natural polymer material, naphthenic sulfate salt, triethanolamine and formaldehyde in the following proportions:

| natural polymer material | 0.5–3.5% |
| --- | --- |
| naphthenic sulfate salt | 0.5–3.5% |
| triethanolamine | 0.1–0.25% |
| formaldehyde | 0.025–0.05% | by weight of cement.

In yet another embodiment, the admixture may comprise natural polymer material, naphthenic sulfate salt, triethanolamine and formaldehyde in the following proportions:

| natural polymer material | 0.1–2% |
| --- | --- |
| naphthenic sulfate salt | 0.1–0.4% |
| triethanolamine | 0.02–0.05% |
| formaldehyde | 0.005–0.02% | by weight of cement.

Preferably the amount of admixture in the concrete will be such that the natural polymer material comprises from 0.1–3.5% by weight of the cement, and in particular such that the admixture comprises natural polymer material comprising from 0.1–3.5% by weight of the cement, naphthenic sulfate salt 0.1–0.5% by weight of the cement, triethanolamine 0.02–0.05% by weight of the cement, and formaldehyde 0.005–0.05% by weight of the cement.

BRIEF DESCRIPTION OF THE DRAWINGS

Some embodiments of the present invention will now be described by way of example and with reference to the accompanying drawings, in which.

DETAILED DESCRIPTION OF PREFERRED EMBODIMENTS

The additive of the present invention is a natural polymer based additive derived from millet and with the addition of naphthenic sulfate salt, triethanolamine formaldehyde and water as will be described below. The millet used as the source material is broomcorn millet (*Panicum Miliaceum*) the seeds of which range from 1 mm to 10 mm in size. The chemical composition of the millet seeds includes protein (9–15%) and fat (3–5%). The important protein components include aspartic acid (0.88–1.38%). threonine (0.49–0.74%), serine (0.59–0.96%), glutamic acid (2.27–3.59%), proline (0.97–1.39%), glycine (0.34–0.49%), alanine (1.16–1.97%), valine (0.64–0.90%), isoleucine (0.56–0.93%), leucine (1.75–2.96%), tyrosine (0.46–0.8%), phenylalanine (0.73–0.94%), lysine (0.24–0.3%), histidine (0.31–0.4%), arginine (0.3–0.6%) and methionine (0.22–0.7%). The millet-derived natural polymer also contains $VB_1$ (0.45–0.82 mg/100 g), $VB_2$ (0.01–0.17 mg/100 g) and Vit (13–400 A/IU).

Four samples of the admixture were prepared with varying proportions of the millet-derived natural polymer and the other components. For each sample the preparation method was as described in the following with reference to FIG. 1.

Figure 1:
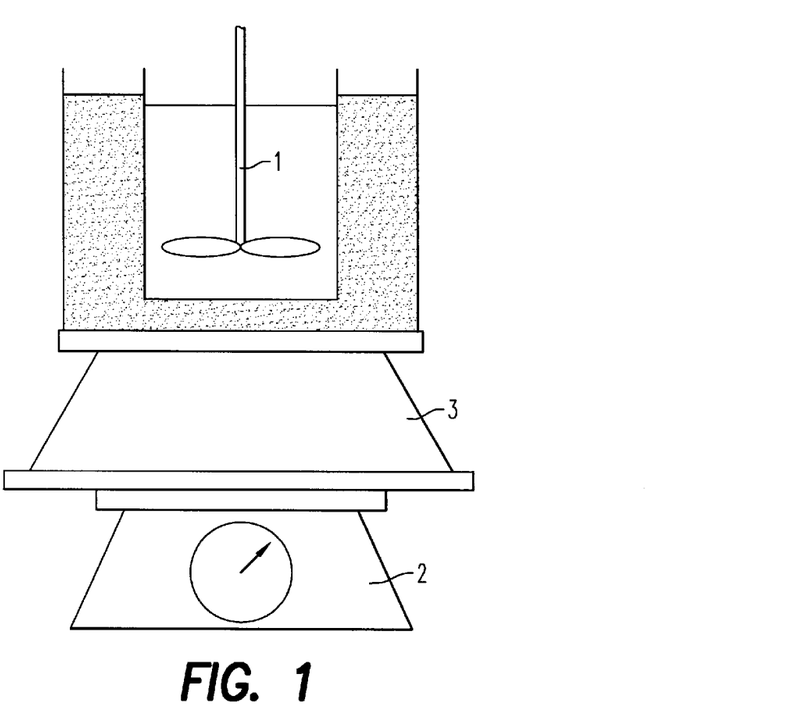
FIG. 1 shows schematically apparatus for preparing an admixture sample.

To produce the admixture the millet grains are ground into a fine powder with particle size in the range of 20–200 microns. The other ingredients of the admixture are then added to the powder in the following manner. Firstly ordinary tap water was heated to boiling point, and then the millet grain powder and the naphthenic sulfate salt were added to the water slowly. The reaction temperature was held at 95° C. for 3 hours while being slowly stirred with stirrer 1. A digital balance 2 underneath monitors the total weight of the admixture and water is added to replace water lost through evaporation. After 3 hours heater 3 is turned off and the mixture is allowed to cool under laboratory conditions. When the temperature has fallen to 30° C. the triethanolamine is added, and then the mixture is allowed to continue to cool to room temperature at which point the formaldehyde is added under continuous stirring. The solid content of the resulting admixture ranges from 10–40% of the admixture by weight.

Four samples of the admixture were prepared with varying proportions of the millet-derived natural polymer, naphthenic sulfate salt, triethanolamine, formaldehyde and water.

Sample 1
Polymer: naphthenic sulfate salt: triethanolamine: formaldehyde: water ratio is 1:1:0.5:0.05:17.45. The solid content in the admixture is 12.8%.

Sample 2
Polymer: naphthenic sulfate salt: triethanolamine: formaldehyde: water ratio is 1:0.4:0.2:0.02:6.38. The solid content in the admixture is 20.3%.

Sample 3
Polymer: naphthenic sulfate salt: triethanolamine: formaldehyde: water ratio is 1:0.3:0.15:0.015:4.58. The solid content in the admixture is 24.4%.

Sample 4
Polymer: naphthenic sulfate salt: triethanolamine: formaldehyde: water ratio is 1:0.2:0.1:0.01:2.69. The solid content in the admixture is 32.8%.

Five concrete mixes were prepared for testing the properties of the admixture samples. In each case the mix comprised Type I ordinary Portland cement, with a crushed gravel aggregate having a nominal maximum size of 10 mm being used as the coarse aggregate, and a fine river sand with a fineness modulus of 2.3 being used as the fine aggregate. The bulk specific gravities of the sand and the gravel were 2.66 and 2.57 and their absorptions were 1.027 and 0.797 percent respectively. The mix proportion was 1:0.6:1.5:2.5 (cement: water: sand: aggregate by weight). One mix was a conventional mix, while the other four mixes each included a quantity of samples 1 to 4 respectively of the admixture. The mix including Sample 1 had an amount of admixture giving a solid content of natural polymer by weight of cement of 0.1%, the mix containing Sample 2 was had an amount of admixture giving a solid content of natural polymer by weight of cement of 0.5%, the mix containing Sample 3 had a solid content of natural polymer by weight of cement of 1%, and finally the mix containing Sample 4 had a solid content by weight of cement of 2%.

All test samples were cast as φ100×200 mm cylinders and vibration-compacted in three approximately equal layers. After 24 hours the samples were demoulded and stored in a water tank for 28 days before being subjected to the tests described hereinbelow.

Figure 2:
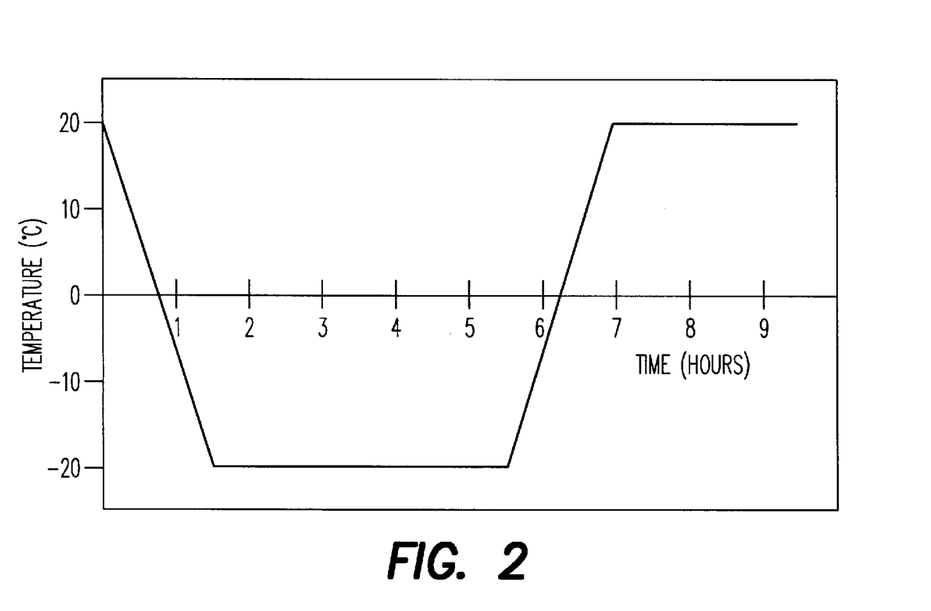
FIG. 2 shows a thermal cycle followed in a testing procedure.

In practice a total of nine cylinders were cast for each mix. Three of these cylinders were used to measure compressive strength and Young's modulus of the mix. The compressive strength test was conducted on a digital closed loop controlled MTS (Material Testing System) machine using a circumferential strain control method in order to obtain a complete stress-strain curve. Three further samples were used in a freeze-thaw test according to ASTM C666. The remaining three samples for each mix were kept in normal atmosphere as control specimens for the freeze-thaw test. In the freeze-thaw test the concrete cylinders were frozen in air to a temperature of −20° C. for four hours and then thawing took place in tap water at a temperature of 20° C. for 2.5 hours. FIG. 2 shows the thermal cycle followed in this test. A Kato environmental chamber was used for the test and each sample underwent 50 freeze-thaw cycles. Upon completion of the cycles the samples and the control samples all underwent compressive strength tests. The crack patterns on the concrete surfaces were also examined.

Figure 3:
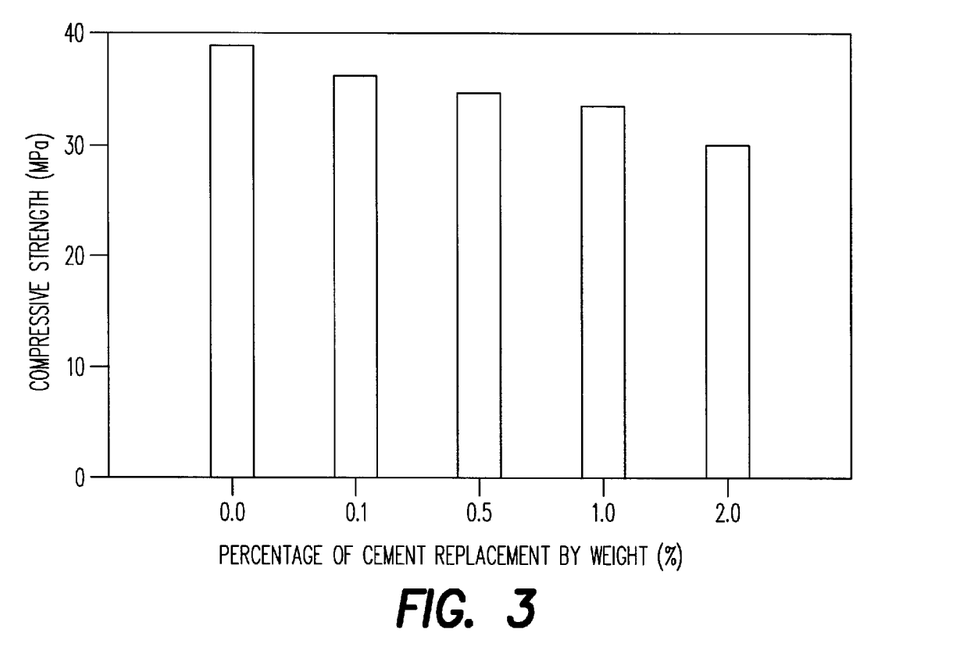
FIG. 3 shows the compressive strength of samples both in accordance with the invention and for control samples.

FIG. 3 shows the compressive strength after 28 days of water curing for the five mixes based on the average results from the three cylinders per mix used for compressive testing. It can be seen that the compressive strength decreases as the percentage by weight of the solid content of the natural polymer increases.

Figure 4:
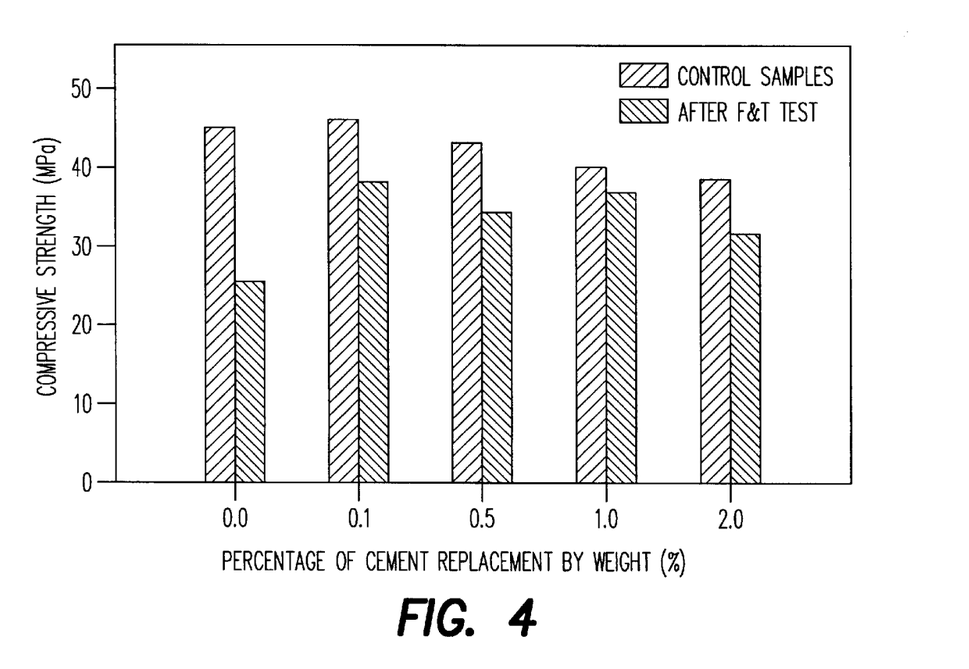
FIG. 4 shows the compressive strength of samples in accordance with the invention and control samples following a number of freeze-thaw cycles, FIG. 5 corresponds to FIG. 4 but shows Young's modulus.
Figure 5:
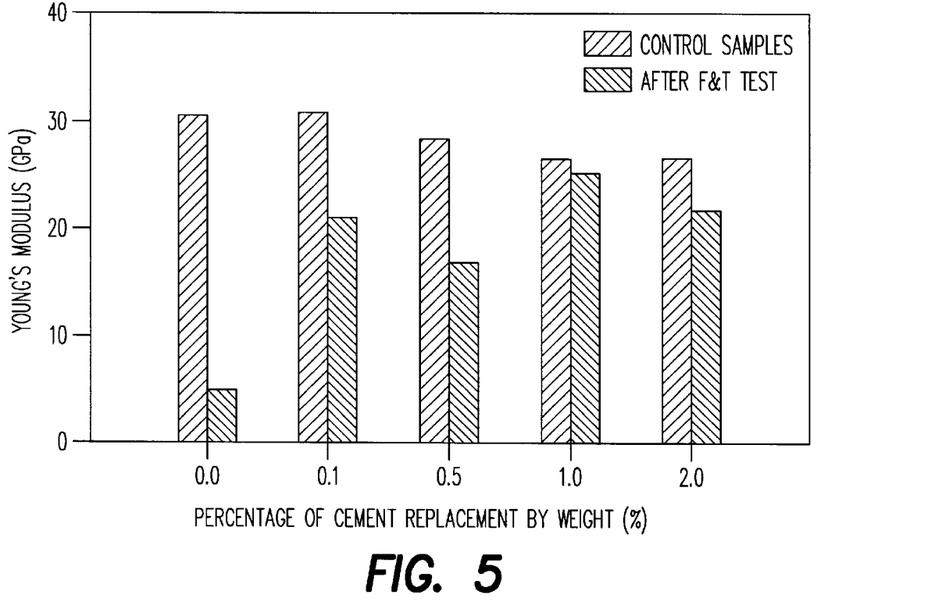

FIGS. 4 and 5 show the compressive strength and Young's modulus of the mixes after undergoing 50 freeze-thaw cycles and in comparison with the control samples. All the mixes show significant reductions in both compressive strength (FIG. 4) and Young's modulus (FIG. 5). However, the results show that the addition of the natural polymer admixture causes a significant improvement in the freeze-thaw resistance of the mix. Even with only 0.1% by weight of natural polymer there is a noticeable improvement and the reduction in compressive strength and Young's modulus is substantially lessened. This clearly demonstrates the improvement in frost resistance caused by the addition of the millet-derived natural polymer admixture.

Figure 6:
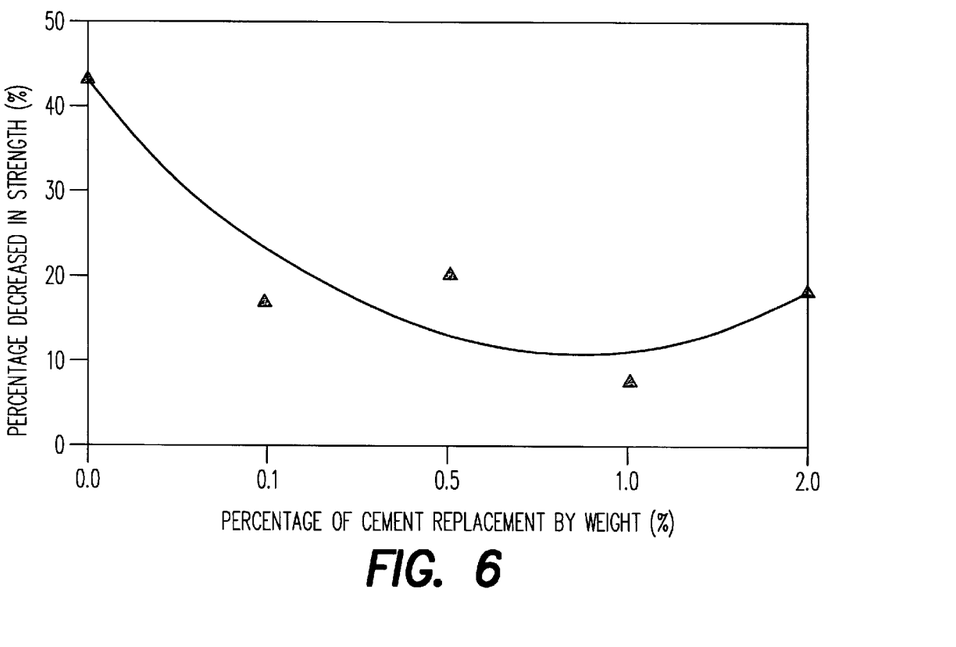
FIG. 6 is a plot showing the percentage reduction in compressive strength as a function of natural polymer added.
Figure 7:
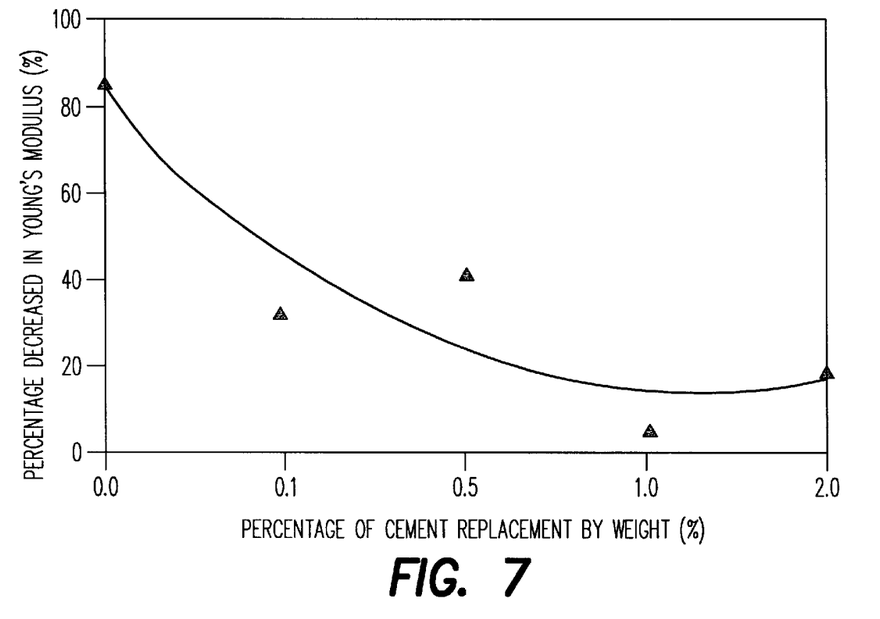
FIG. 7 is a plot corresponding to FIG. 6 but showing reduction in Young's modulus.
Figure 8:
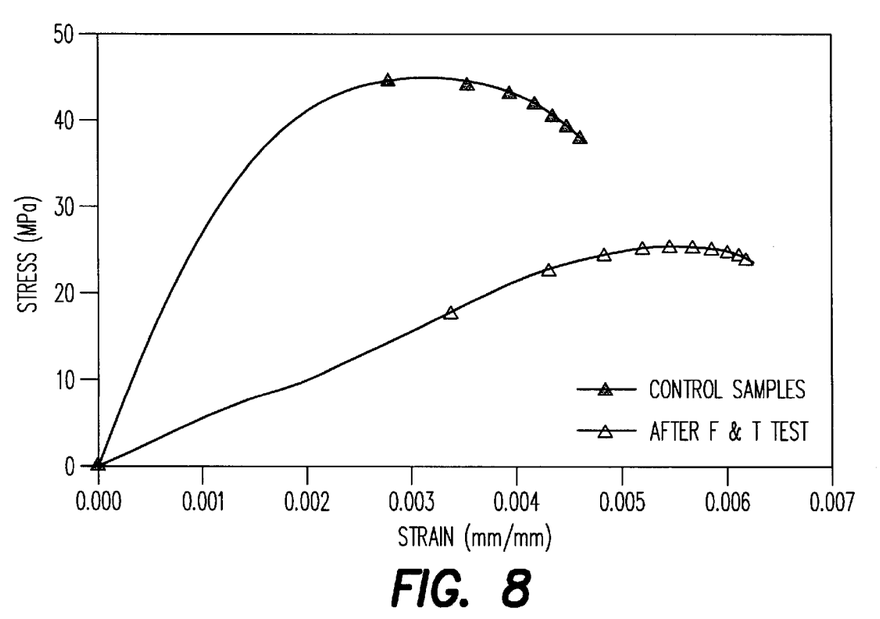
FIG. 8 shows a stress-strain curve for plain concrete in accordance with the prior art.
Figure 9:
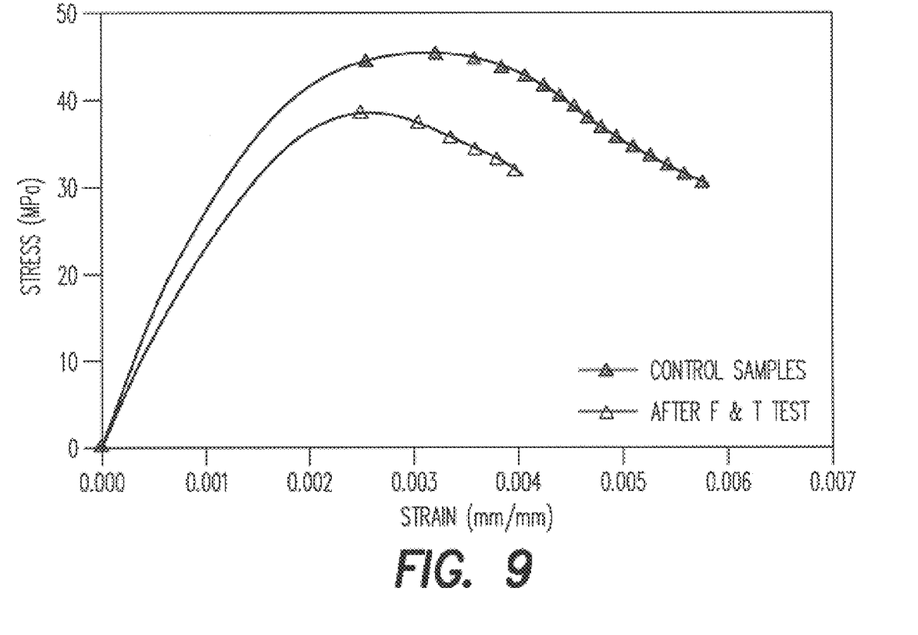
FIG. 9 shows a stress-strain curve for concrete in accordance with an embodiment of the present invention.
Figure 10A:
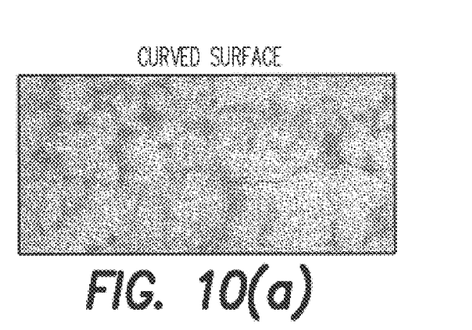
FIGS. 10(a)–(d) shows photographs of plain and modified concrete following freeze-thaw cycles.
Figure 10B:
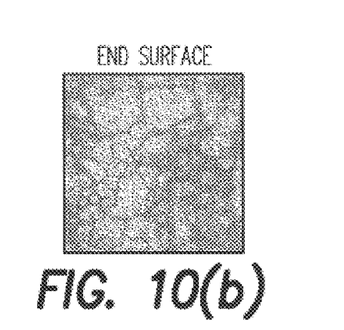
Figure 10C:
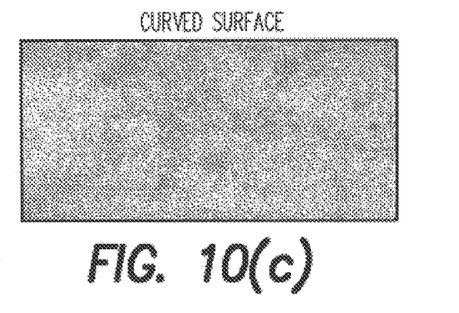
Figure 10D:
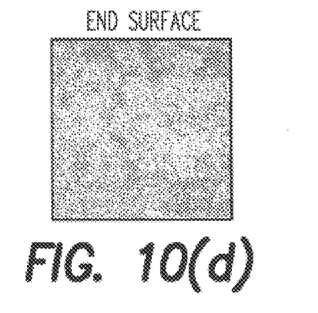

FIGS. 6 and 7 show the percentage reduction in compressive strength and Young's modulus respectively as a function of the percentage of natural polymer added to the mix, and these graphs show that the optimum amount of natural polymer additive is in the range of 0.1–2.0% of the solid content by weight of the cement. In this range the compressive strength and the Young's modulus can be as much as 80% higher after the freeze-thaw cycles than for the control samples. This can be further seen from FIGS. 8 and 9 which show complete stress-strain curves for plain and natural polymer modified concrete respectively. Visual inspection of the surfaces of the concrete mixes after undergoing 50 freeze-thaw cycles also demonstrates the improvement in frost resistance caused by the admixture of the present invention. FIGS. 10(a) and (b) are photographs of the curved (a) and end (b) surfaces of plain concrete, while FIGS. 10(c) & (d) are the same views of natural polymer modified concrete with 0.1% cement replacement. FIGS. 10(c) & (d) show significantly fewer surface cracks. It is well known that the presence of open and continuous cracks in the surface will decrease a concrete member's effective cross-sectional area and in turn decrease its Young's modulus and compressive strength.

The beneficial effects of the present invention with respect to improved frost resistance can also be seen by examining microstructural changes in the concrete after undergoing freeze-thaw cycles, and also by examining water permeability.

Figure 11A:
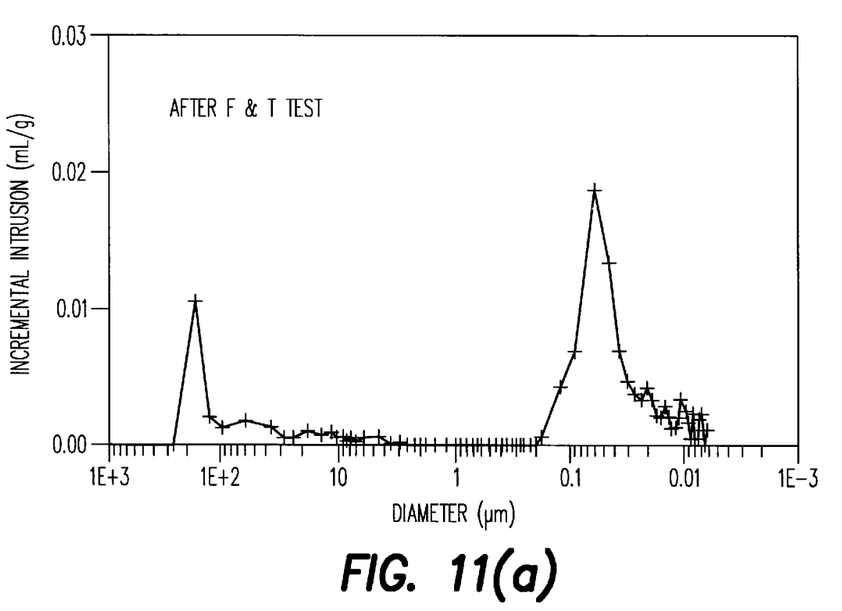
FIGS. 11(a)–(b) show mercury porosimetry results for plain concrete.
Figure 11B:
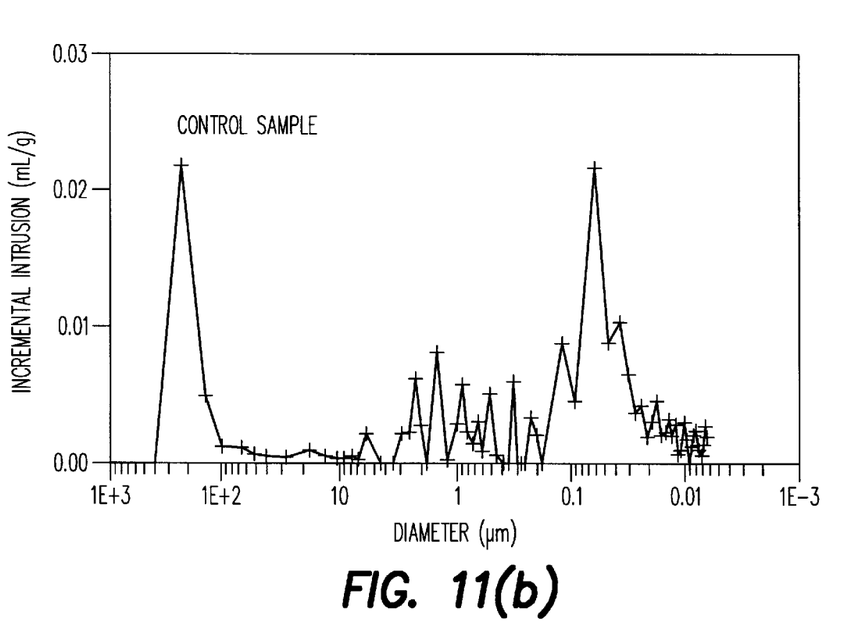
Figure 12A:
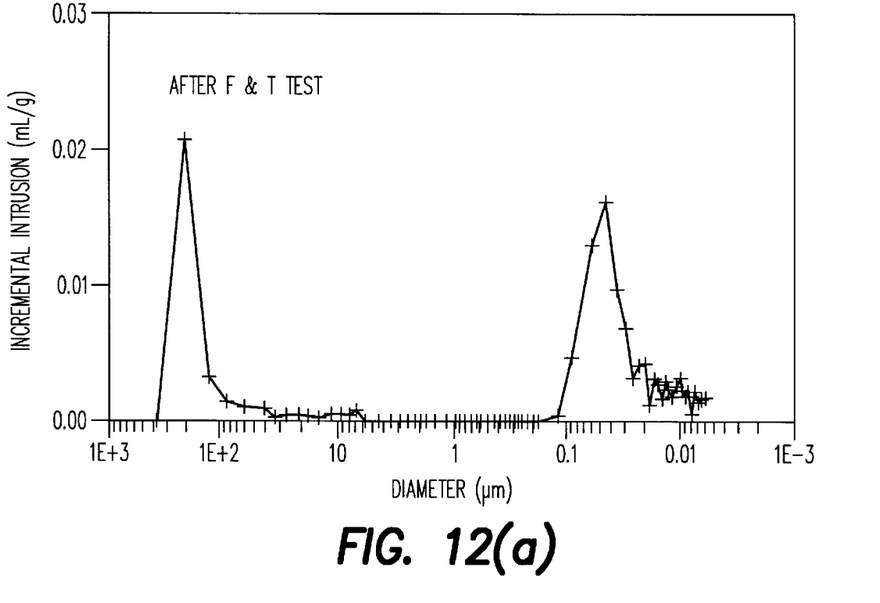
FIGS. 12(a)–(b) show mercury porosimetry results for concrete in accordance with an embodiment of the present invention.
Figure 12B:
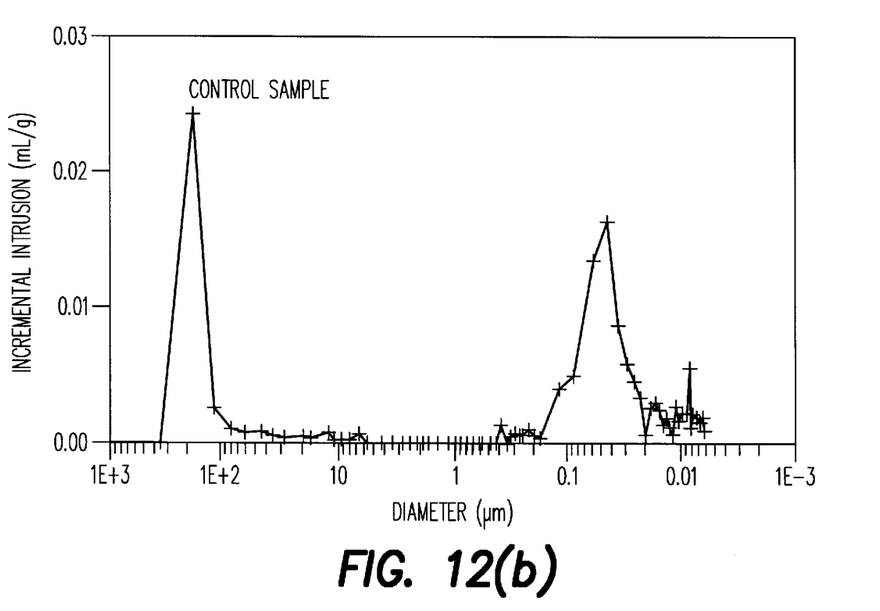

To study the effect of the millet derived natural polymer admixture on frost resistance of concrete from a microstructural point of view, mercury intrusion porosimetry measurements may be conducted on both normal and natural grain polymer modified concrete both with and without undergoing multiple freeze-thaw cycles. The results are shown in FIGS. 11(a) and (b) for plain concrete (a) after freeze-thaw cycles and (b) before freeze-thaw tests, and FIGS. 12(a) and (b) for natural grain polymer modified concrete (a) after freeze-thaw cycles and (b) before freeze-thaw tests. The results show that the microstructure of the natural grain polymer modified concrete is very stable and both the pore sizes and amount are broadly similar with or without undergoing freeze-thaw cycles. In contrast the microstructure of plain concrete is substantially altered by the freeze-thaw cycle.

Figure 13:
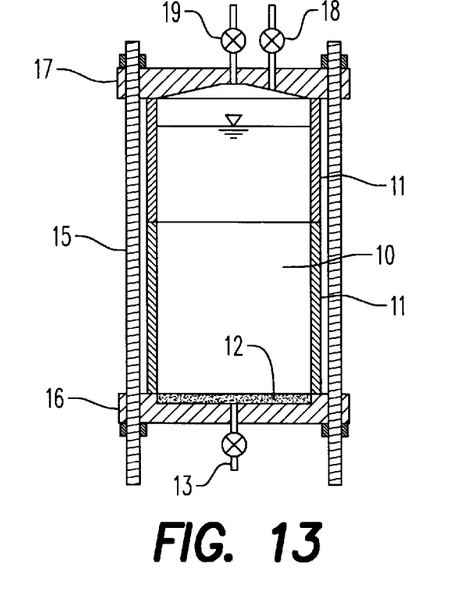
FIG. 13 shows schematically apparatus for studying water permeability of concrete samples.

Water permeability may be studied by using the test apparatus of FIG. 13. A concrete sample 10 is retained within a rigid wall 11. Beneath the sample 10 is located a porous stone 12 and an effluent port 13, above the sample is provided permeant 14 which is maintained under pressure. The apparatus is clamped by rods 15 between bottom 16 and top 17 clamping plates. An influent port 18 and a vent port 19 are provided in the top plate 17. The concrete samples are prepared with a waterproof coating on the top surface facing the permeant save for a 50 mm diameter hole. With this apparatus the specimens were tested under a constant pressure of 0.5 MPa for three days. The specimens were then split into two and the permeability index was determined by measuring the depth of penetration of the permeant. The results are as follows for samples with 1% N.P. by weight of cement and without the admixture.

| With admixture | Without admixture |
| --- | --- |
| 21 mm | 28 mm |
| 19 mm | 30 mm |
| 20 mm | 30 mm |

From these results it can be seen clearly that the addition of the natural polymer admixture reduces water permeability in concrete and thus that the water resistance of the concrete has been enhanced.

Figure 14:
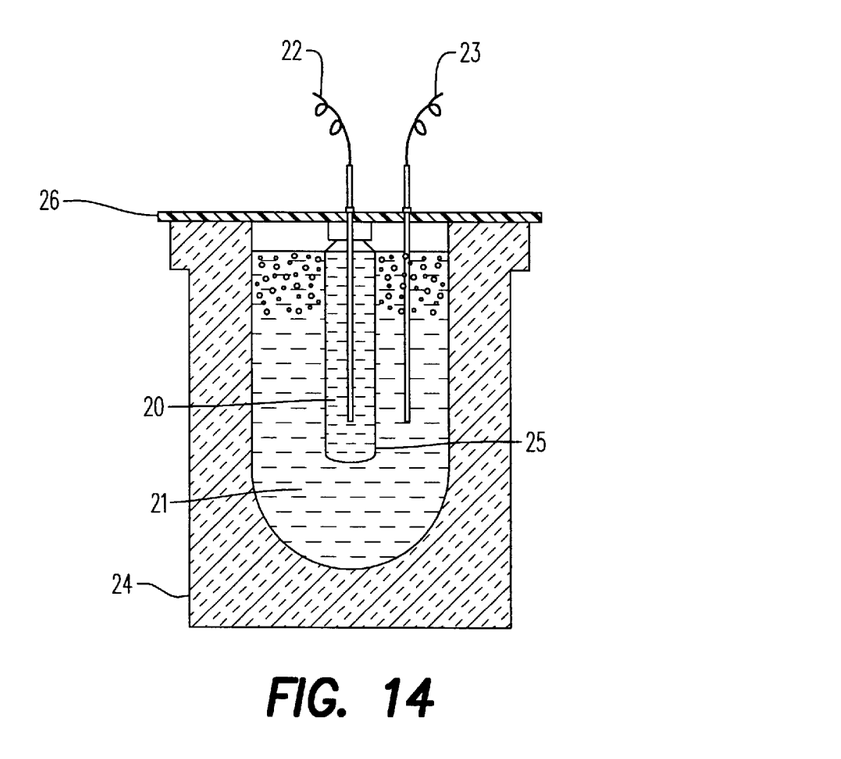
FIG. 14 shows schematically apparatus for studying temperature depression characteristics of the admixture, and FIG. 15 plots temperature against time for admixtures in accordance with the invention and control solutions.

To further understand the mechanism by which the admixture enhances the resistance of concrete to freeze-thaw cycles, and the temperature depression curve for the admixture may be studied. To this end a temperature depression test is conducted for five solutions:

1. 5% aqueous NaCl solution
2. Distilled water
3. 0.5% aqueous natural polymer solution
4. 1% aqueous natural polymer solution
5. 5% aqueous natural polymer solution FIG. 14 illustrates the experimental set-up. A sample solution 20 is sealed in a Kimax tube 25 within an encompassing ice+acetone+brine mixture 21. Thermometers 22 and 23 were used to monitor the temperature in the sample and the encompassing ice+acetone+brine solution respectively. A Dewar flask 24 with a capacity of 2000 ml was used to hold the mixture and the sample. The encompassing mixture is adjusted to a temperature of −11.4° C. before testing. The lid of the Kimax tube 25 is fixed to a cover 26 to of the Dewar flask made from an acrylic sheet. Two holes were drilled in the cover 26 to locate the thermometers 22,23 which are fixed so as to be held vertically and at a depth of 90 mm.

The ice-acetone-brine encompassing mixture is prepared in the following manner. The Dewar flask 24 is loaded with crushed ice to its maximum capacity and then 1000 ml acetone is added, followed by 150 g NaCl and through mixing of the ice-acetone-brine mixture. With these proportions the mixture will be at approximately −12° C. To obtain the desired temperature of −11.4° C. 20–50 ml of distilled water can be added. If the temperature is still below the desired temperature more distilled water can be added. If the temperature goes above the desired temperature, more NaCl can be added. Following preparation of the ice-acetone-brine mixture, the test can be conducted in accordance with the following procedure:

46 ml of the sample solution is placed in the Kimax tube. The lid of the tube is screwed on and the tube thus fixed to the cover. The solution may be stirred to ensure that it is thoroughly mixed. A thermometer probe is placed in the Kimax sample tube, taking care to ensure that the thermometer is kept along the longitudinal axis of the tube away from the walls. This is important to secure consistent results since the temperature close to the wall will be lower than the temperature in the middle. The temperature of the sample is recorded at this point. The second thermometer is located in the same way through the cover and the temperature likewise recorded. The cover is then placed over the Dewar flask. Simultaneously a timer is started and temperature is monitired as a function of time.

Figure 15:
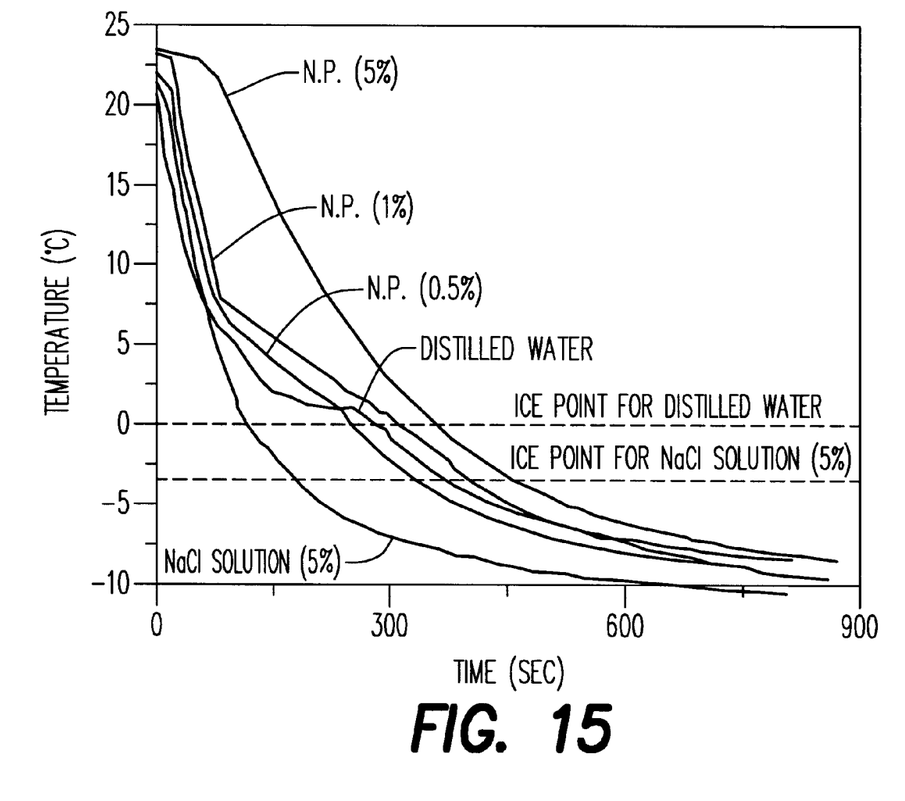

FIG. 15 plots temperature against time for the five solutions. The following Table also shows some key values.

| Solution | 5% NaCl | DW | 0.5% NP | 1.0% NP | 5.0% NP |
| --- | --- | --- | --- | --- | --- |
| At 150s (° C.) | −2.1 | 2 | 3.8 | 5.3 | 14 |
| At 300s (° C.) | −7.1 | −2.5 | −1.2 | 0.2 | 2.3 |
| At 450s (° C.) | −8.9 | −6.4 | −5.5 | −5.1 | −3.4 |
| At 600s (° C.) | −9.8 | −8.1 | −7.4 | −7.2 | −6.2 |

From the table and from FIG. 15 it can be seen that a higher concentration of natural polymer derived admixture causes a slower temperature depression, especially during the initial early stages. This can be attributed to the fact that natural polymer molecules are large and not such a good heat conductor as compared with distilled water or NaCl solution. This confirms that natural polymer solution can protect concrete by slowing down the freezing process.

What is claimed is:

1. A concrete admixture for enhancing the durability of concrete to freeze-thaw cycles, said admixture comprising a natural polymer material obtained from millet.

2. An admixture as claimed in claim 1 wherein said admixture comprises natural polymer material derived from millet, naphthenic sulfate salt, triethanolamine and formaldehyde.

3. An admixture as claimed in claim 2 wherein said admixture comprises natural polymer material obtained from millet, naphthenic sulfate salt, triethanolamine and formaldehyde in water with a solid content of the admixture being from 10% to 40% by weight.

4. An admixture as claimed in claim 3 wherein said admixture comprises natural polymer material, naphthenic sulfate salt, triethanolamine, formaldehyde and water in the proportions:

| | |
|---|---|
| natural polymer material | 1 |
| naphthenic sulfate salt | 1.0–0.1 |
| triethanolamine | 0.5–0.05 |
| formaldehyde | 0.5–0.01 |
| water | 2.4–20 | by weight.

5. An admixture as claimed in claim 4 wherein the proportions are:

| | |
|---|---|
| natural polymer material | 1 |
| naphthenic sulfate salt | 1.0–0.2 |
| triethanolamine | 0.5–0.1 |
| formaldehyde | 0.05–0.01 |
| water | 2.69–17.45 | by weight.

6. A concrete mix including an admixture for enhancing the freeze-thaw durability of the mix, said admixture including a natural polymer material obtained from millet.

7. A concrete mix as claimed in claim 6 wherein said admixture comprises natural polymer obtained from millet, naphthenic sulfate salt, triethanolamine and formaldehyde.

8. A concrete mix as claimed in claim 7 wherein said admixture comprises natural polymer material obtained from millet, naphthenic sulfate salt, triethanolamine and formaldehyde in water with a solid content of the admixture being from 10% to 40% by weight.

9. A concrete mix as claimed in claim 8 wherein said admixture comprises natural polymer material, naphthenic sulfate salt, triethanolamine, formaldehyde and water in the proportions:

| | |
|---|---|
| natural polymer material | 1 |
| naphthenic sulfate salt | 1.0–0.2 |
| triethanolamine | 0.5–0.1 |
| formaldehyde | 0.05–0.01 |
| water | 2.69–17.45 | by weight.

10. A concrete mix as claimed in claim 9 wherein the admixture proportions are:

| | |
|---|---|
| natural polymer material | 1 |
| naphthenic sulfate salt | 1.0–0.2 |
| triethanolamine | 0.5–0.1 |
| formaldehyde | 0.05–0.01 |
| water | 2.69–17.45 | by weight.

11. A concrete mix as claimed in claim 7 wherein the natural polymer material comprises from 0.5–3.5% by weight of the cement.

12. A concrete mix as claimed in claim 7 wherein the admixture comprises natural polymer material comprising from 0.5–3.5% by weight of the cement, naphthenic sulfate salt 0.5–3.5% by weight of the cement, triethanolamine 0.1–0.25% by weight of the cement, and formaldehyde 0.025–0.05% by weight of the cement.

13. A concrete mix as claimed in claim 7 wherein the admixture comprises natural polymer material comprising from 0.1–2% by weight of the cement, naphthenic sulfate salt 0.1–0.4% by weight of the cement, triethanolamine 0.02–0.05% by weight of the cement, and formaldehyde 0.005–0.02% by weight of the cement.

* * * * *